(12) United States Patent
Connor et al.

(10) Patent No.: US 8,985,960 B2
(45) Date of Patent: Mar. 24, 2015

(54) METHOD AND SYSTEM FOR SEALING A DOVETAIL

(75) Inventors: James Ryan Connor, Greenville, SC (US); Mark Steven Honkomp, Taylors, SC (US)

(73) Assignee: General Electric Company, Schenectady, NY (US)

( * ) Notice: Subject to any disclaimer, the term of this patent is extended or adjusted under 35 U.S.C. 154(b) by 931 days.

(21) Appl. No.: 13/075,999

(22) Filed: Mar. 30, 2011

(65) Prior Publication Data

US 2012/0251328 A1 Oct. 4, 2012

(51) Int. Cl.
*F01D 5/30* (2006.01)
*F01D 11/00* (2006.01)
*F16J 15/08* (2006.01)

(52) U.S. Cl.
CPC ............ *F01D 5/3007* (2013.01); *F01D 11/006* (2013.01); *F16J 15/0887* (2013.01); *F05D 2250/71* (2013.01)
USPC .................................................... 416/219 R

(58) Field of Classification Search
CPC ......... F01D 5/30; F01D 5/3007; F01D 5/303; F01D 5/3015; F01D 5/3038; F01D 5/32; F01D 11/006; F05D 2240/30
USPC .......... 416/215, 218, 219 R, 220 R, 221, 248; 277/395, 433, 530, 644, 647
See application file for complete search history.

(56) References Cited

U.S. PATENT DOCUMENTS

| | | | |
|---|---|---|---|
| 3,588,131 A * | 6/1971 | Nicholson | 277/611 |
| 3,674,279 A * | 7/1972 | McMurray et al. | 277/380 |
| 5,257,909 A | 11/1993 | Glynn et al. | |
| 6,296,172 B1 | 10/2001 | Miller | |
| 6,315,298 B1 | 11/2001 | Kildea et al. | |
| 6,398,499 B1 * | 6/2002 | Simonetti et al. | 416/193 A |
| 8,011,894 B2 | 9/2011 | Arness et al. | |

(Continued)

FOREIGN PATENT DOCUMENTS

| | | |
|---|---|---|
| CN | 101624920 A | 1/2010 |
| DE | 102009026050 A1 | 1/2010 |

(Continued)

OTHER PUBLICATIONS

Search Report and Written Opinion from corresponding EP Application No. 12161012.5-1610 dated Apr. 2, 2013.

(Continued)

*Primary Examiner* — Ninh H Nguyen
(74) *Attorney, Agent, or Firm* — Armstrong Teasdale LLP

(57) ABSTRACT

A method and system for sealing a gap between a bucket dovetail and a rotor is provided. The dovetail seal includes a first end portion extending from a first extent of the first end portion a predetermined distance along a length of the dovetail seal, a second end portion extending from a first extent of the second end portion a predetermined distance along a length of the dovetail seal towards the first end portion, and a body extending between the first and second end portions. The body includes a U-shaped bend complementary to a sealing groove in a dovetail of a turbine blade. The first end portion includes a converging flared cross-section from the first extent of the first end portion toward the second end portion and the second end portion includes a converging flared cross-section from the first extent of the second end portion toward the first end portion.

19 Claims, 5 Drawing Sheets

(56) References Cited

U.S. PATENT DOCUMENTS

| | | | |
|---|---|---|---|
| 8,210,821 B2 | 7/2012 | Arness et al. | |
| 8,215,914 B2 | 7/2012 | Danescu et al. | |
| 2006/0219608 A1* | 10/2006 | Scott et al. | 209/406 |
| 2010/0007096 A1* | 1/2010 | Ward et al. | 277/595 |
| 2010/0008769 A1* | 1/2010 | Arness et al. | 415/174.2 |
| 2010/0008781 A1 | 1/2010 | Ward et al. | |
| 2010/0008782 A1* | 1/2010 | Danescu et al. | 416/219 R |
| 2010/0008783 A1 | 1/2010 | Arness et al. | |
| 2010/0068062 A1 | 3/2010 | DiMascio et al. | |
| 2010/0068063 A1* | 3/2010 | Berg et al. | 416/223 A |
| 2011/0305576 A1* | 12/2011 | Ward et al. | 416/220 R |

FOREIGN PATENT DOCUMENTS

| | | |
|---|---|---|
| DE | 102009026057 A1 | 1/2010 |
| EP | 2143885 A1 | 1/2010 |
| EP | 2143887 A2 | 1/2010 |
| JP | 2000045705 A | 2/2000 |

OTHER PUBLICATIONS

Unofficial English translation of Office Action issued in connection with corresponding CN Application No. 201210103770.X on Nov. 4, 2014.

* cited by examiner

METHOD AND SYSTEM FOR SEALING A DOVETAIL

BACKGROUND OF THE INVENTION

The field of the invention relates generally to any type of turbine, and more specifically, to a method and a system for sealing a gap between a turbine bucket dovetail and a turbine rotor using a deformable locking seal.

Gas turbines generally include a turbine rotor (wheel) with a number of circumferentially spaced buckets (blades). The buckets generally may include an airfoil, a platform, a shank, a dovetail, and other elements. The dovetail of each bucket is positioned within the turbine rotor and secured therein. The airfoils project into the hot gas path so as to convert the kinetic energy of the gas into rotational mechanical energy. A number of cooling medium passages may extend radially through the bucket to direct an inward and/or an outward flow of the cooling medium therethrough.

Leaks may develop in the coolant supply circuit based upon a gap between the tabs of the dovetails and the surface of the rotor due to increases in thermal and/or centrifugal loads. Air losses from the bucket supply circuit into the wheel space may be significant with respect to blade cooling medium flow requirements. Moreover, the air may be extracted from later compressor stages such that the penalty on energy output and overall efficiency may be significant during engine operation.

Efforts have been made to limit this leak. However, though the known seals may seal the gap well and may be durable, the known seals cannot be easily disassembled and replaced in the field.

BRIEF DESCRIPTION OF THE INVENTION

In one embodiment, a dovetail seal includes a first end portion extending from a first extent of the first end portion a predetermined distance along a length of the dovetail seal, a second end portion extending from a first extent of the second end portion a predetermined distance along a length of the dovetail seal towards the first end portion, and a body having a length extending between the first and second end portions. The body includes a U-shaped bend complementary to a sealing groove in a dovetail of a turbine blade. The first end portion includes a converging flared cross-section from the first extent of the first end portion toward the second end portion and the second end portion includes a converging flared cross-section from the first extent of the second end portion toward the first end portion.

In another embodiment, a method of sealing a gap between a bucket dovetail and a rotor includes aligning a U-shaped seal with a sealing groove of the dovetail, translating the seal along the sealing groove in an outwardly radial direction with respect to the dovetail, spreading the legs of the U-shaped seal by the translation such that the legs of the seal are resiliently biased in the unspread direction, engaging an inclined surface of the sealing groove with a portion of a surface of the seal, and relaxing the bias on the legs by the engaging.

In yet another embodiment, a dovetail seal assembly for sealing a gap between a bucket dovetail and a rotor includes a rotor including a plurality of circumferentially spaced slots, each slot configured to matingly engage a respective dovetail of a turbine bucket, a turbine bucket including a sealing groove formed in the dovetail, and a sealing member including a U-shaped hollow body having a longitudinal cut therein extending a length of the sealing member, where the cut is oriented away from an opening of the sealing groove.

BRIEF DESCRIPTION OF THE DRAWINGS

FIG. 1 is a perspective view of a bucket in accordance with an exemplary embodiment of the present invention;

FIG. 2 is a perspective view of a rotor in accordance with an exemplary embodiment of the present invention;

FIG. 3 is a perspective view of a dovetail seal in accordance with an exemplary embodiment of the present invention;

FIG. 4 is a side view of the dovetail seal;

FIG. 5 is a side view of a portion of the bucket including a tab;

DETAILED DESCRIPTION OF THE INVENTION

The following detailed description illustrates embodiments of the invention by way of example and not by way of limitation. It is contemplated that the invention has general application to analytical and methodical embodiments of sealing fluid leakage paths in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
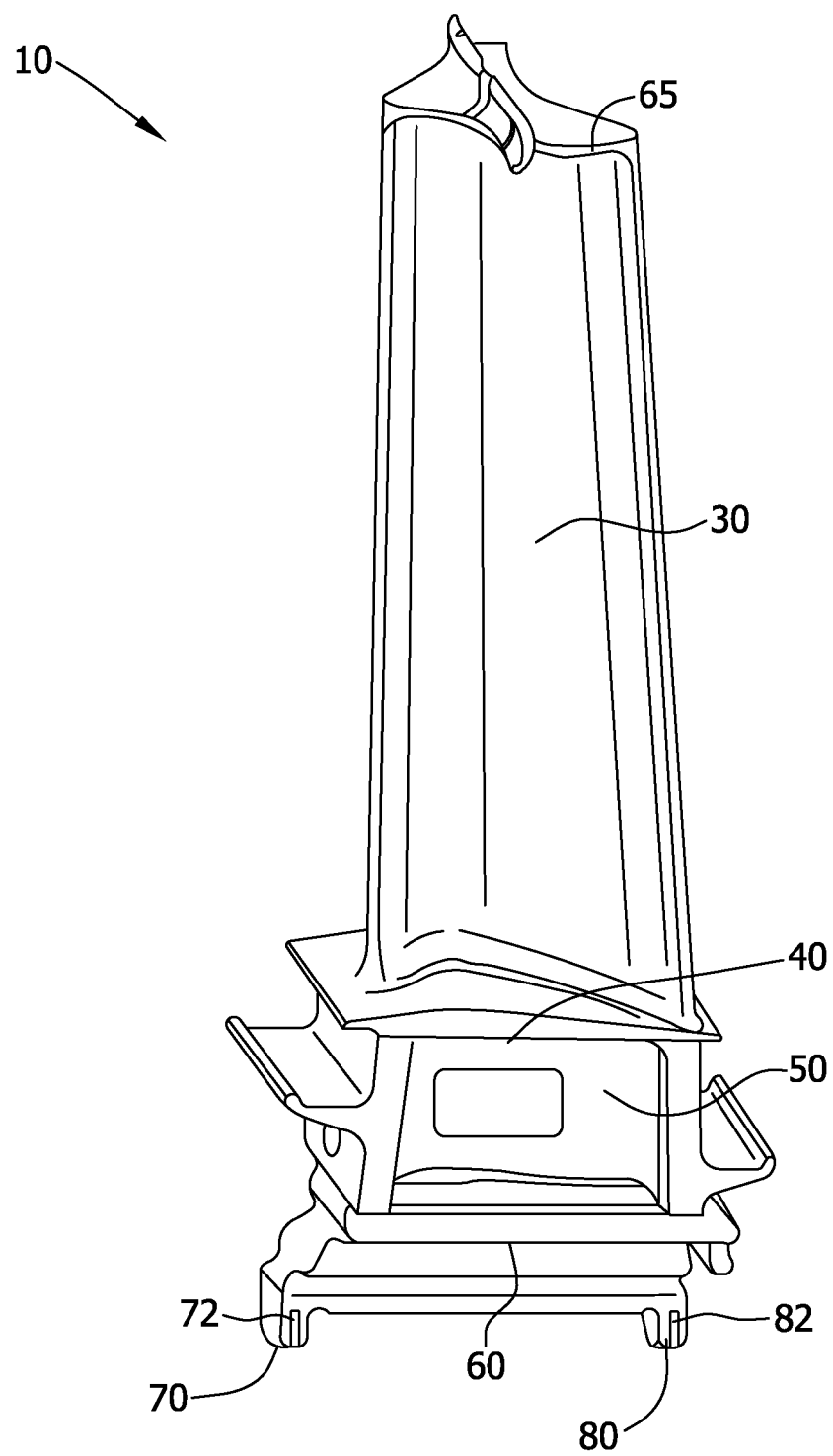
FIGS. 1-5 show exemplary embodiments of the method and system described herein.

FIG. 1 is a perspective view of a bucket 10 in accordance with an exemplary embodiment of the present invention. Bucket 10 may be for example, a first or a second stage bucket as used in a 9FB gas turbine commercially available from General Electric Company of Schenectady, N.Y. Any other type of bucket or stage also may be used herein. Bucket 10 may be used with a rotor 20 (shown in FIG. 2).

In the exemplary embodiment, bucket 10 includes an airfoil 30, a platform 40, a shank 50, a dovetail 60, and other elements. It will be appreciated that the bucket 10 is one of a number of circumferentially spaced buckets 10 secured to and about rotor 20 of the turbine. In one embodiment, bucket 10 includes a shroud 65 on one end of airfoil 30. In various other embodiments, bucket 10 lacks shroud 65. Any other type of bucket design may be used herein. Airfoils 30 of buckets 10 project into the hot gas stream so as to enable the kinetic energy of the stream to be converted into mechanical energy through the rotation of rotor 20. Dovetail 60 may include a first tang or tab 70 and a second tab 80 extending therefrom. Similar designs may be used herein. A gap may be formed between the ends of tabs 70, 80 of dovetail 60 and rotor 20. Flow from the hot gas stream or high pressure cooling flow may escape via the gap. Tab 70 includes a sealing groove 72 and tab 80 may also include a sealing groove 82.

Figure 2:
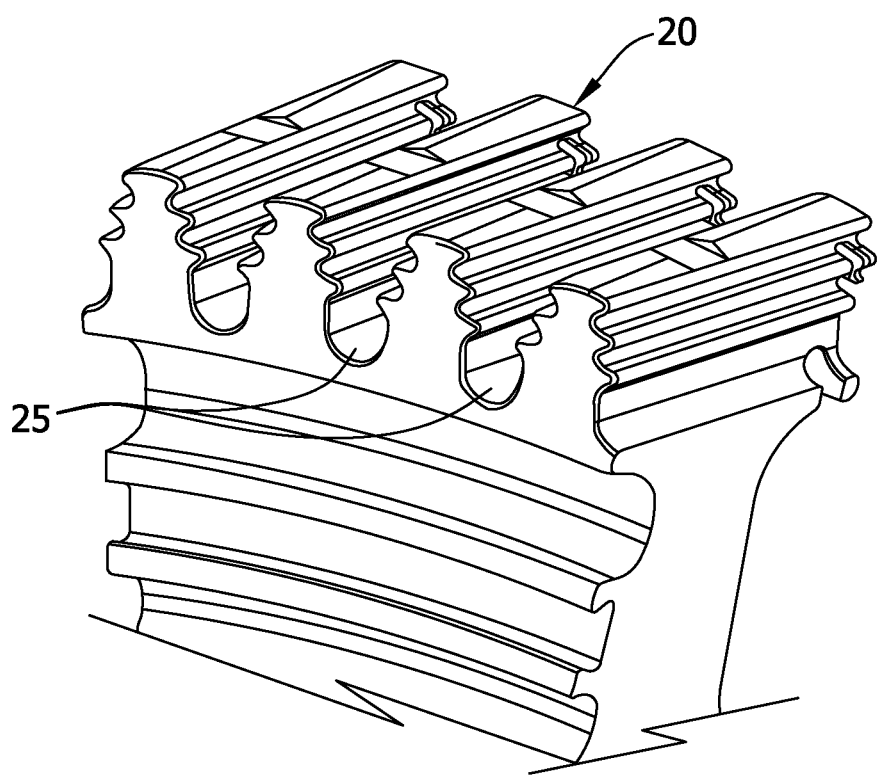

FIG. 2 is a perspective view of a rotor 20 in accordance with an exemplary embodiment of the present invention. In the exemplary embodiment, rotor 20 includes a plurality of slots 25 for receiving dovetails 60 of buckets 10.

Figure 3:
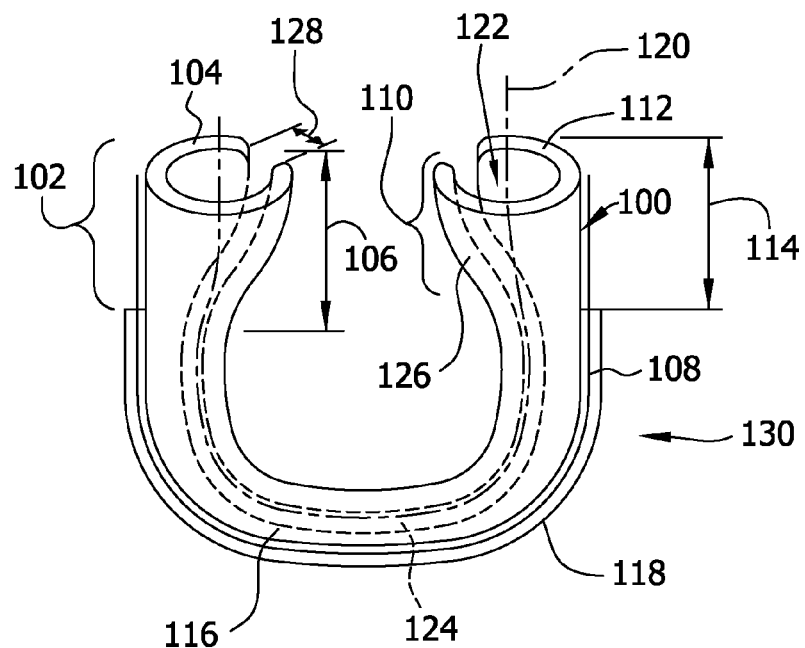
Figure 4:
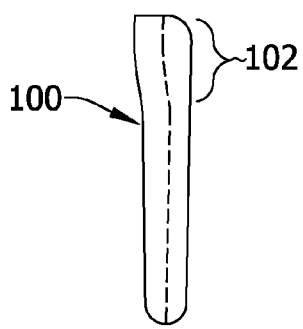
Figure 5:
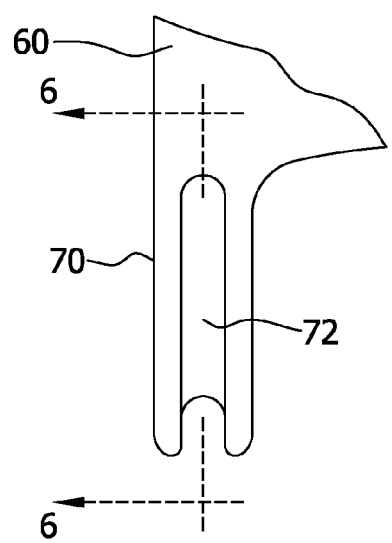

FIG. 3 is a perspective view of a dovetail seal 100 in accordance with an exemplary embodiment of the present invention. FIG. 4 is a side view of dovetail seal 100. FIG. 5 is a side view of a portion of bucket 10 including tab 70. In the exemplary embodiment, dovetail seal 100 is positioned within sealing groove 72 of first tab 70 of dovetail 60 of bucket 10. Sealing groove 72 extends about a perimeter of first tab 70. The dimensions and shape of the sealing groove 72 may vary, in whole or in part, about tab 70. Sealing groove 72 may be formed with conventional machining techniques. Other types of manufacturing techniques also may be used herein. In various embodiments, dovetail seal 100 comprises a deformable material having a substantially square cross-section, a nearly circular cross-section, a "c"-shape, or any other desired design. Specifically, an axial or a radial c-seal may be used. The deformable material may be formed of, for example, but not limited to, a woven graphite, a woven metal, a woven intermetallic, a woven ceramic, a sintered metal/graphite, vapor deposited graphite on a metal backing, hybrids of metal/graphite/ceramics, sheet metal of stainless steel or austenitic nickel-chromium-based superalloy, such as Inconel® and other types of deformable materials. In the exemplary embodiment, dovetail seal 100 is configured to sealing groove 72 as well as the gap between bucket 10 and rotor 20. A dovetail seal (not shown) also may be used with second tab 80 and elsewhere.

In the exemplary embodiment, dovetail seal 100 includes a first end portion 102 extending from a first extent 104 of first end portion 102 a predetermined distance 106 along a length 108 of dovetail seal 100. Dovetail seal 100 also includes a second end portion 110 extending from a first extent 112 of second end portion 110 a predetermined distance 114 along length 108 of dovetail seal 100 towards first end portion 102. Dovetail seal 100 further includes a body 116 having a length 118 extending between first end portion 102 and second end portion 110. First end portion 102 includes a converging flared cross-section from first extent 104 of first end portion 102 toward second end portion 110 and second end portion 110 includes a converging flared cross-section from first extent 112 of second end portion 110 toward first end portion 102. Body 116 includes an elongate cylindrical shape, a U-shaped bend complementary to sealing groove 72, and a hollow interior 122 extending along a centerline 120 of body 116. A cut 124 extends along length 108 from a radially outer surface 126 of body 116 to hollow interior 122. In one embodiment, cut 124 extends along surface 126 parallel to centerline 120 from extent 104 to extent 112. In various embodiments, cut 124 extends only a portion of length 108 parallel to centerline 120. In still other embodiments, cut 124 extends arcuately along at least a portion of surface 126, for example, but not limited to, within end portions 102 and/or 110. A width 128 of cut 124 may be variable along length 108. In the exemplary embodiment, width 128 is substantially constant along length 118 and variable within end portions 102 and/or 110. In various embodiments, the converging flared cross-section extends only partially around a circumference of first end portion 102 and/or second end portion 110. The converging flared cross-section is complementary to an inclined surface (not shown in FIGS. 3A, 3B, and 3C) in sealing groove 72. The converging flared cross-section is configured to matingly engage the complementary inclined surface to lock dovetail seal 100 in sealing groove 72. To facilitate locking dovetail seal 100 in sealing groove 72, dovetail seal 100 is formed of a material that is resilient in a plane 130 of centerline 120.

Figure 6:
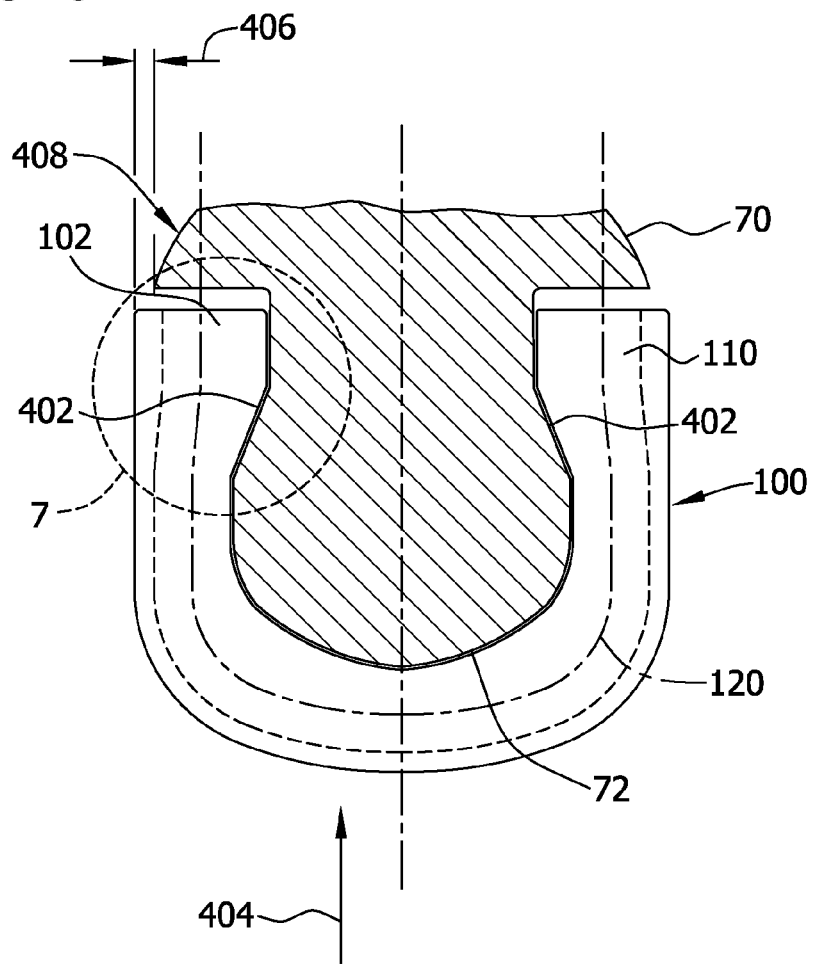
FIG. 6 is a side view of a dovetail sealing assembly taken along lines 6-6 shown in FIG. 5 and in accordance with an exemplary embodiment of the present invention.
Figure 7:
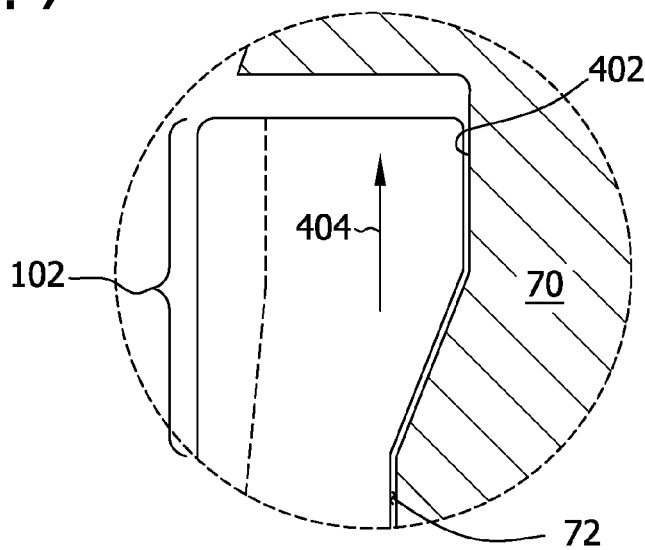
FIG. 7 is an expanded view of a portion of the dovetail seal and the sealing groove.

FIG. 6 is a side view of a dovetail sealing assembly 400 taken along lines 6-6 (shown in FIG. 5) and in accordance with an exemplary embodiment of the present invention. FIG. 7 is an expanded view of a portion of dovetail seal 100 and sealing groove 72. In the exemplary embodiment, dovetail sealing assembly 400 includes dovetail seal 100 and sealing groove 72. Sealing groove 72 includes an inclined surface 402 configured to receive the converging flared cross-section of first end portion 102 and/or second end portion 110.

During installation in sealing groove 72, dovetail seal 100 is slid onto tab 70 in sealing groove 72 in a radially outward direction 404 with respect to dovetail 60 and rotor 20. The converging flared cross-section of first end portion 102 and/or second end portion 110 sliding along the surface of sealing groove 72 force first end portion 102 and second end portion 110 outwardly in the plane of centerline 120. The converging flared cross-sections spread away from each other until the converging flared cross-sections engage inclined surface 402 when the resilient forces overcome the friction of the surface of sealing groove 72 and dovetail seal 100 snaps into a fully engaged position (shown in FIG. 6). In the fully engaged position, dovetail seal 100 is locked into sealing groove 72 and a portion 406 of the converging flared cross-section extends beyond sealing groove 72 and beyond an edge 408 of tab 70 to provide a compression fit between tab 70 and rotor 20 when bucket 10 is inserted into slot 25.

Figure 8:
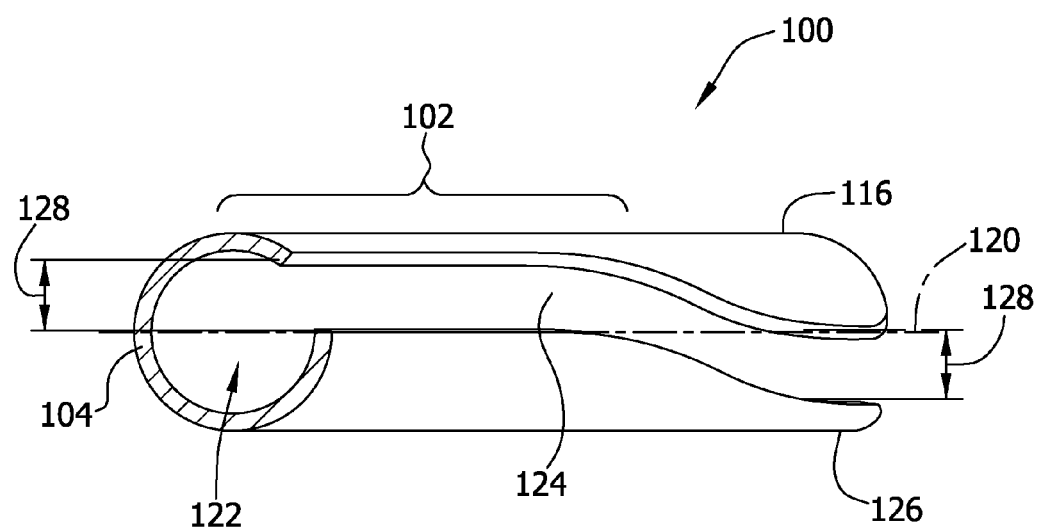
FIG. 8 is a perspective view of a portion of dovetail seal in accordance with an exemplary embodiment of the present invention.

FIG. 8 is a perspective view of a portion of dovetail seal 100 in accordance with an exemplary embodiment of the present invention. In the exemplary embodiment, cut 124 extends from radially outer surface 126 of body 116 to hollow interior 122. In one embodiment, cut 124 is a split line wave cut and extends along surface 126 parallel to centerline 120 from extent 104 to extent 112 (shown in FIG. 3). In various embodiments, cut 124 extends only a portion of length 108 parallel to centerline 120. In still other embodiments, cut 124 extends arcuately along at least a portion of surface 126, for example, but not limited to, within end portions 102 and/or 110. A width 128 of cut 124 may be variable along length 108. In the exemplary embodiment, width 128 is substantially constant along length 118 and variable within end portions 102 and/or 110. In various embodiments, the converging flared cross-section extends only partially around a circumference of first end portion 102 and/or second end portion 110. The split line wave cut feature permits stretch forming by providing a rotated adjacent round retention feature due to extra material being available. Additionally, the split line wave cut creates a retention contact surface that has a local end spring back deformation capability. Moreover, a rotation of cut 124 with respect to sealing groove 72 may be different along body 116 than along end portions 102 and/or 110 such that cut 124 is completely within sealing groove 72 to prevent seal 100 from catching on components or material external to sealing groove 72.

The above-described embodiments of a method and system of forming a resilient seal that locks onto a bucket dovetail using a groove having an inclined surface configured to engage a complementary feature on the dovetail seal that provides a cost-effective and reliable means for sealing a gap between a bucket dovetail and a rotor. As a result, the method and system described herein facilitate reducing leakage in a gas turbine engine in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dovetail seal comprising:
a first end portion extending from a first extent of the first end portion a predetermined distance along a length of the dovetail seal;
a second end portion extending from a first extent of the second end portion a predetermined distance along the length of the dovetail seal towards the first end portion; and
a body having a length extending between the first and second end portions, said body comprising a U-shaped bend complementary to a sealing groove in a dovetail of a turbine blade;
where said first end portion comprises a converging flared cross-section from the first extent of the first end portion toward the second end portion and said second end portion comprises a converging flared cross-section from the first extent of the second end portion toward the first end portion.

2. A dovetail seal in accordance with claim 1, wherein said body comprises a C-shaped cross-section.

3. A dovetail seal in accordance with claim 2, wherein the cut extends along a surface of the body parallel to the centerline.

4. A dovetail seal in accordance with claim 2, wherein the cut is arcuate with respect to the centerline in at least one of the first end portion and the second end portion.

5. A dovetail seal in accordance with claim 2, wherein a width of the cut is variable along the length.

6. A dovetail seal in accordance with claim 1, wherein said body comprises:
an elongate cylindrical shape having a radially outer surface and a hollow interior extending along a centerline of said body; and
a cut extending along the length of the dovetail seal and extending from the radially outer surface of said body in to said hollow interior.

7. A dovetail seal in accordance with claim 1, wherein each respective said converging flared cross-section extends only partially around a circumference of each respective said end portion.

8. A dovetail seal in accordance with claim 7, wherein each respective said converging flared cross-section is configured to matingly engage each respective complementary inclined surface to lock said dovetail seal in the sealing groove in the dovetail of the turbine blade.

9. A dovetail seal in accordance with claim 1, wherein each respective said converging flared cross-section is complementary to a respective inclined surface in the sealing groove in the dovetail of the turbine blade.

10. A dovetail seal in accordance with claim 1, wherein said body is resilient in a plane of a centerline of the body.

11. The method of claim 10, further comprising machining the sealing groove into the dovetail, the sealing groove having the inclined surface.

12. A method in accordance with claim 11, further comprising opening a cut in a surface of the seal, the cut extending through the body in a line parallel to a centerline of the seal.

13. A system in accordance with claim 12, wherein said body comprises a C-shaped cross-section.

14. A system in accordance with claim 13, wherein said sealing groove comprises a surface complementary to said flared end portion, said flared end portion configured to engage said surface in a friction fit.

15. A system in accordance with claim 12, wherein said cut extends through said body along a length of said body.

16. A system in accordance with claim 12, wherein said sealing member is resilient in a plane of a centerline of said sealing member to facilitate locking engagement of said sealing member in said sealing groove.

17. A method in accordance with claim 10, further comprising forming said seal having a hollow cylindrical body.

18. A method of sealing a gap between a bucket dovetail and a rotor, said method comprising:
aligning a U-shaped seal with a sealing groove of the dovetail, the U-shaped seal including a first end portion, a second end portion, and a body extending therebetween, wherein the first end portion includes a converging flared cross-section extending from a first extent of the first end portion toward the second end portion and the second end portion includes a converging flared cross-section extending from a first extent of the second end portion toward the first end portion;
translating the seal along the sealing groove in an outwardly radial direction with respect to the dovetail;
spreading the first end portion and the second end portion of the U-shaped seal away from each other by the translation such that the first end portion and the second end portion of the seal are resiliently biased towards each other;
engaging an inclined surface of the sealing groove with the first end portion and the second end portion of the seal, the inclined surface being inclined radially inward with respect to a plane of a centerline of the sealing groove; and
relaxing the bias on the first end portion and the second end portion by said engaging.

19. A dovetail seal assembly comprising:
a rotor comprising a plurality of circumferentially spaced slots, each slot configured to matingly engage a respective dovetail of a turbine bucket;
a turbine bucket comprising a sealing groove formed in said dovetail, said turbine bucket defining a gap between said bucket dovetail and said rotor; and
a sealing member comprising a U-shaped hollow body extending a length of said sealing member, said hollow body comprising a flared end portion, said hollow body further comprising a longitudinal cut therein, where said cut is oriented away from an opening of said sealing groove, said sealing member extending between said rotor and said bucket dovetail to seal said gap.

* * * * *